Aug. 12, 1941.  R. LAPSLEY  2,252,080
GEAR SHIFTING MECHANISM
Filed March 15, 1939    3 Sheets-Sheet 1
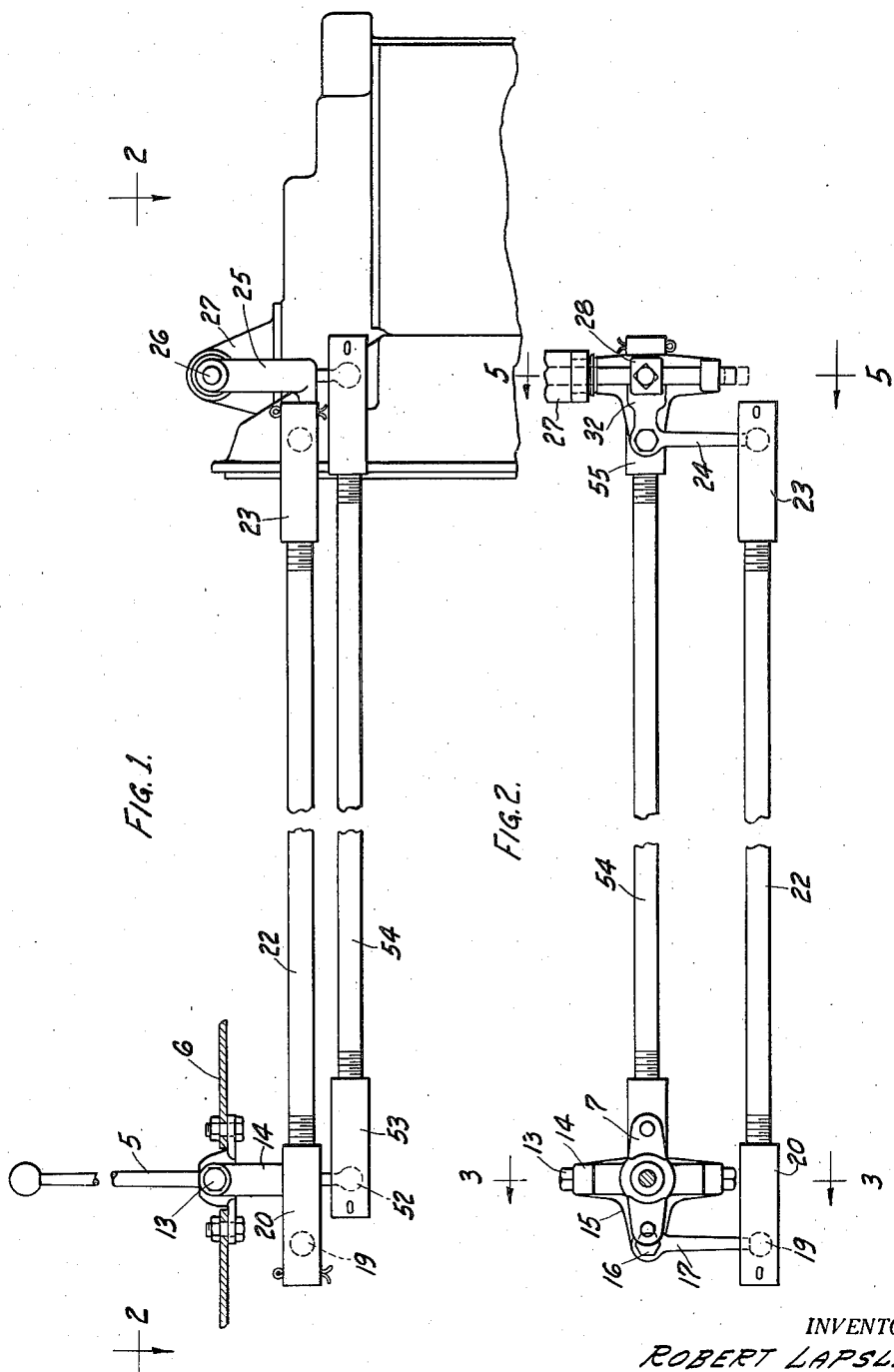
INVENTOR.
ROBERT LAPSLEY.
BY Walter E. Schismer
ATTORNEY.

Aug. 12, 1941.   R. LAPSLEY   2,252,080
GEAR SHIFTING MECHANISM
Filed March 15, 1939   3 Sheets-Sheet 2
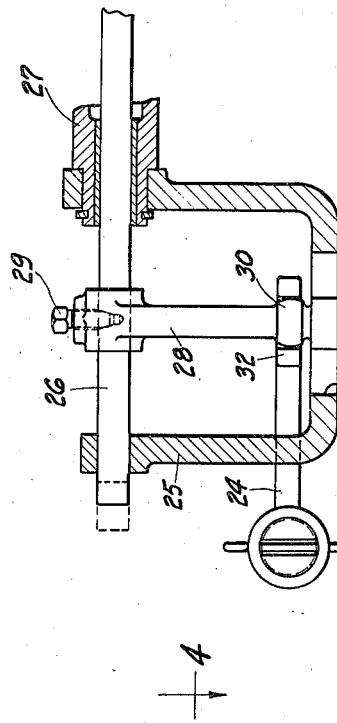
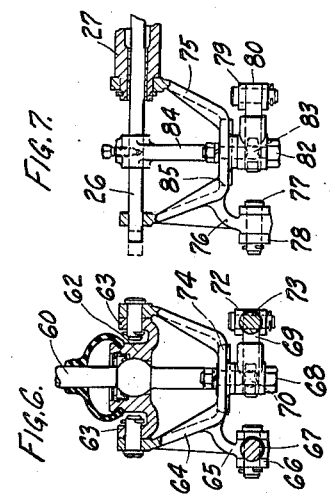
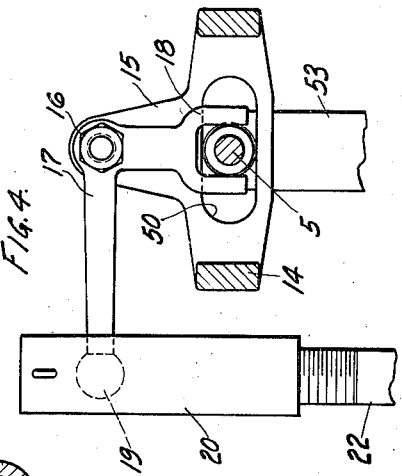
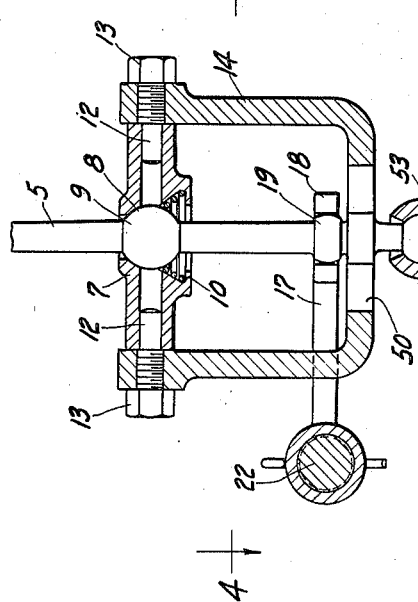
INVENTOR.
ROBERT LAPSLEY.
BY Walter E. Schirmer
ATTORNEY.

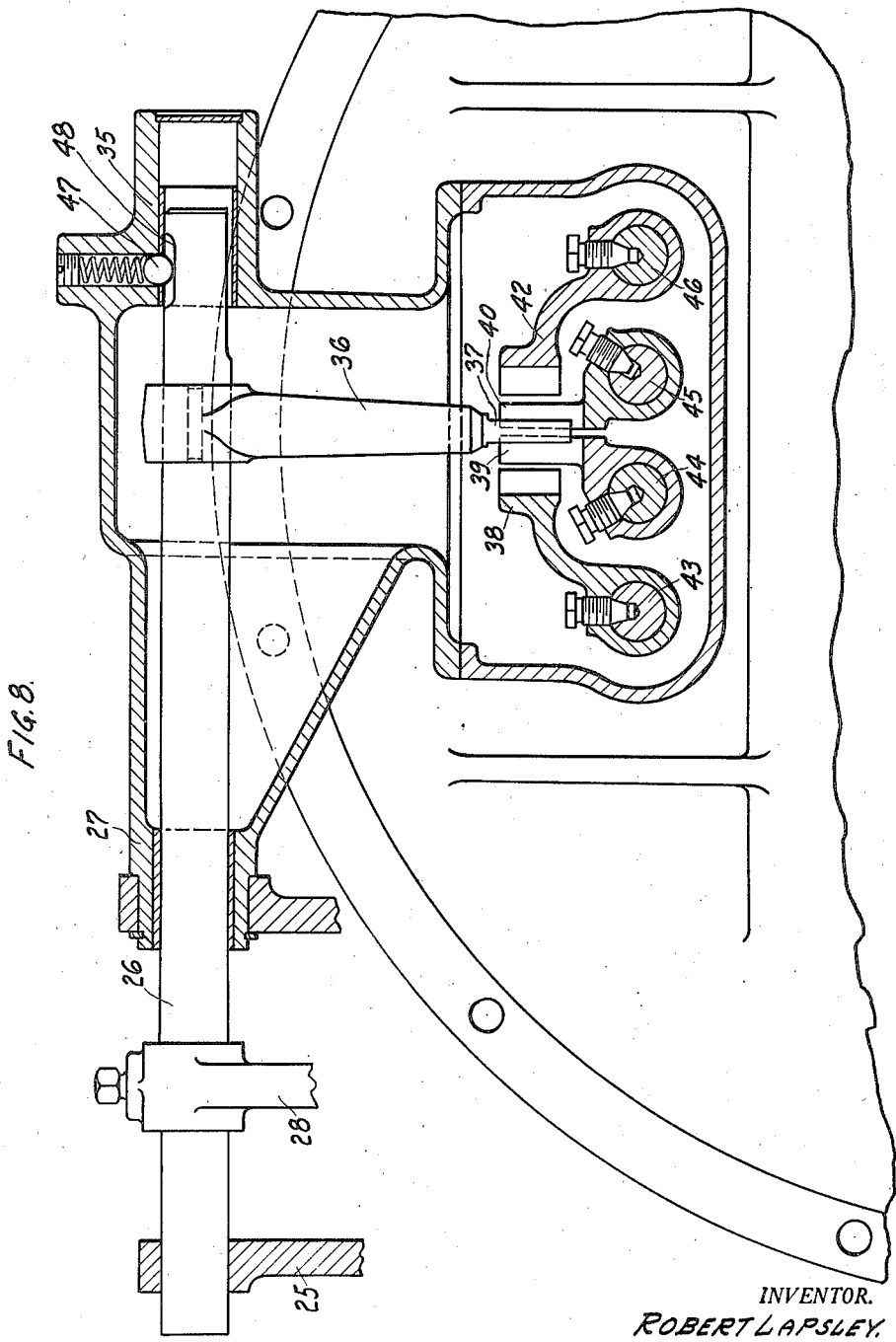

Patented Aug. 12, 1941

2,252,080

UNITED STATES PATENT OFFICE 2,252,080

GEAR SHIFTING MECHANISM

Robert Lapsley, Berrien Springs, Mich., assignor to Clark Equipment Company, Buchanan, Mich., a corporation of Michigan Application March 15, 1939, Serial No. 261,863

15 Claims. (Cl. 74—473)

This invention relates to gear shift mechanisms, and more particularly is directed to remotely controlled gear shifts such as used in busses, motor trucks, and similar vehicles where the transmission is located at such a distance from the operator that direct gear shifting is not feasible.

With the advent of cab-over-engine trucks and rear engine drives, it has become increasingly prevalent to locate the transmission at a point remote from the drive, which requires that some means be provided for transmitting the gear shifting movement from the operator's compartment to the shift rails in the transmission, thereby materially reducing the cost of manufacture and facilitating assembly and repair of the mechanism.

Another feature of the present invention is the use of swinging bracket means controlled by movement of the gear shifting lever and carrying a bell crank member which provides for the selecting movement upon lateral rocking of the gear shift lever.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is an elevational view of one form of the present invention;

Figure 2 is a plan view taken substantially on line 2—2 of Figure 1;

Figure 3 is a detailed sectional view of the mechanism at the lower end of the gear shift lever taken on line 3—3 of Figure 2;

Figure 4 is a sectional view taken substantially on line 4—4 of Figure 3;

Figure 5 is a sectional view through the mechanism at the operating rod;

Figure 6 is a view corresponding to Figure 3 of a modified form of construction;

Figure 7 is a view similar to Figure 5 of a modified form of construction utilized with that shown in connection with Figure 6; and Figure 8 is a sectional view of the construction at the transmission.

Considering now the drawings in detail, a gear shift lever is indicated generally at 5 and is supported for movement upon a suitable supporting member 6 by means of a bracket 7, which bracket may be bolted or otherwise secured to the supporting means, and has a spherical seat 8 adapted to receive the ball portion 9 of the lever 5. A suitable spring 10 normally urges the lever against the seat so that it is universally supported in the bracket 7. The bracket 7 is provided with oppositely extending bores adapted to receive the stub ends 12 of screw members 13 upon which is hung a U-shaped hanger or bracket 14 having rocking movement by means of the stud portions 12 with respect to the bracket 7.

The bracket or hanger 14 has an extension 15 in the base portion thereof upon which is mounted a pin 16 forming a fulcrum for the bell crank lever 17. This lever 17 at one end is provided with a fork portion 18 engaging about a suitable boss portion 19 at the lower end of the lever 5 and extends laterally outwardly of the forward portion of the hanger 14 and terminates in a ball 19 mounted within the fitting 20, to which is connected the motion transmitting rod 22. It will be apparent that when the lever 5 is rocked laterally as shown in Figures 3 and 4, the forked end 18 of the lever 17 will be correspondingly rocked, rotating the bell crank lever 17 about the pivot 16, and consequently producing longitudinal movement of the rod 22. At its opposite end the rod 22 is provided with a fitting 23 corresponding to the fitting 20, which is adapted to receive the extending ball end of a second bell crank lever 24 pivoted on a corresponding hanger 25 carried by the operating rod 26 extending into the transmission housing 27. The hanger 25 has rocking movement with respect to the housing 27 in a manner similar to the rocking movement of the hanger 14 with respect to the bracket 7. Mounted on the rod 26 intermediate the arms of the hanger is an actuating arm 28 which is keyed or otherwise suitably non-rotatably connected thereto as by means of a set screw 29.

The arm 28 has a boss portion 30 which extends between the forked end 32 of the bell crank 24 whereby longitudinal movement of the rod 22 will result in rotation of the lever 24, and consequent lateral movement of the forked end 32 which produces lateral movement of the arm 28 and consequent axial movement of the operating rod 26. The rod 26 extends through the transmission case 27 into the interior of the transmission, and is suitably journalled at its opposite end in a boss portion 35 of a cap member secured on the transmission. Within the housing 27 the rod 26 is provided with an operating arm 36 which, at its lower end, has an engaging portion 37 adapted to be selectively engaged with the shift forks 38, 39, 40 and 42 mounted on the respective shift rails 43 to 46, respectively.

It will be apparent that with this construction, longitudinal movement of the rod 22 imparts axial movement to the operating rod 26 and consequently provides for selective movement into any one of the respective shift forks 38 to 42 carried by the shift rails within the transmission.

A suitable ball detent 47 is provided in the housing 27 and is spring pressed into the relieved portion 48 of the rod 26 to limit the axial movement of this rod and to hold it in selected axially shifted position.

Referring again to Figures 1, 3 and 4, the lever 5 extends downwardly through a slot 50 formed in the base of the hanger 14, and at its lower end is provided with a ball portion 52 engaged within a fitting secured to the end of a motion transmitting rod 54. The slot 50 accommodates the lateral rocking of the lever 5 to effect the selecting movement of the operating rod 26 without in any manner moving the bracket 14. However, when the lever 5 is moved fore or aft, as viewed in Figure 1, the hanger 14 is rotated about the studs 12, and consequently, the lever 17, as well as the rod 22, lever 24 and hanger 25, are also moved in the same direction, the hangers 14 and 25 rotating relative to the axis of the bracket 7 and the rod 26 during this time. The longitudinal movement of the rod 54 is transmitted to the actuating arm 28 through a fitting 55 at the opposite end of the rod 54 in which is engaged a ball portion 56 formed at the lower end of the actuating arm 28. Consequently, this fore and aft movement of the shift lever 5 will produce a rocking movement of the arm 28 resulting in a corresponding oscillation of the operating rod 26, and a corresponding longitudinal movement of the shift rail which is engaged by the arm 36. Thus, with this construction, the selecting movement is provided through the bell cranks and rod 22, while the actual gear shifting movement is provided through the connections of the lever 5 and arm 28 by means of the rod 54. Thus the operating rod 26 is axially moved for selection of the desired shift rail, and is rotated to effect longitudinal movement of the selected shift rail. It will be noted that the hanger 25 is also provided with a slot 57 in the base portion thereof to accommodate the axial shifting movement of the arm 28 and rod 26 upon rotation of the bell crank 24.

In Figures 6 and 7 I have shown a modified form of construction which will now be described in detail. In this embodiment of the invention the general principles of operation are the same but the hangers and rod connections for transmitting motion between the lever 5 and the operating rod 26 have been revised.

Considering now Figure 6 in detail the gear shifting lever 60 is mounted for universal support in a bracket 62 corresponding to the bracket 7, which bracket has arm portions 63 forming journals upon which the hanger 64 is mounted for rotation. The hanger 64 has an integral lateral extension 65 to which is connected a clevis member 66 fitted to the end of a motion transmitting rod 67 corresponding to the rod 54. Thus upon fore and aft movement of the lever 60 the hanger 64 is rotated about the journals 63 and imparts longitudinal movement to the rod 67.

The hanger 64 is also provided with a pivot stud 68 upon which is mounted a bell crank lever 69, this lever being engaged by the lower end 70 of the lever 60 whereby lateral rocking of the lever produces rotation of the bell crank 69 which, through the clevis connection 72, is connected to the motion transmitting rod 73 corresponding to the rod 22. The hanger 64 is also provided with a slotted portion 74 accommodating this lateral rocking of the lever 60 in the same manner as provided by the slot 50 in the hanger 14.

At the transmission end of the mechanism, the operating rod 26, together with the housing 27 forms a support for a hanger 75 corresponding to the hanger 25 of Figure 5, which has a lateral extension 76 adapted to receive the pin 77 for securing a clevis 78 thereto, the clevis 78 being in turn connected to the rod 67. In a similar manner the motion transmitting rod 73 is connected through the clevis 79 to one end 80 of a bell crank lever pivotally mounted on the stud 82 and engaged by the lower end 83 of an actuating arm 84 which extends through a lateral slot 85 in the hanger 75, and is non-rotatably secured to the operating rod 26 intermediate the arms of the hanger 75.

With this construction it will be apparent that lateral rocking of the lever 60 results in longitudinal movement of the rod 73 which in turn transmits through the bell crank 80 axial movement to the operating rod 26 to select the desired shift rail in the transmission. Fore and aft movement of the lever 60 results in swinging movement of the hanger 64, and consequent longitudinal movement of the rod 67 which in turn swings the hanger 75 and functions to rotate the arm 84 for correspondingly rotating the shaft 26.

It will thus be apparent that the mechanism shown in Figures 6 and 7 utilize the same features and principles of operation as that described in connection with Figures 1 to 5.

In both these constructions angular displacement or out of line relationship between the lever and the operator's compartment and the transmission can be accommodated due to the ball and socket connections between the motion transmitting rods and the actuating means at the ends thereof. This allows for use of such a construction in a wide variety of locations and applications, and may require some small revision of design of certain of the parts to meet certain specific conditions.

Inasmuch as such changes are well within the scope of the underlying principles involved in the present invention, I do not intend to be limited to the exact details herein illustrated and described, but only insofar as defined by the scope and spirit of the appended claims.

I claim:

1. In combination, a transmission having an operating rod, a remotely disposed gear shift lever, pivotally mounted U-shaped hangers at said lever and said rod, means for transmitting fore and aft movement of said lever into rotation of said rod, and bell cranks carried by said hangers and interconnected by a motion-transmitting rod for transmitting lateral rocking of said lever into axial shifting movement of said operating rod.

2. Means for transmitting shifting movement of a universally supported gear shift lever to a remote point comprising a U-shaped hanger pivotally swung from the support of said lever and engaged by the lower end of the lever, a bell crank pivotally mounted on said hanger having a forked arm engaged by said lever upon lateral rocking thereof, a motion-transmitting rod connected to the other arm of said bell crank, and a motion-transmitting rod connected to said hanger and actuated upon fore and aft movement of the lever.

3. The combination, with claim 2, of a transmission operating rod having a corresponding hanger pivotally hung to swing thereabout, a bell crank mounted on said hanger, and an arm between said operating rod and said hanger and bell crank, said motion transmitting rods being respectively connected to said second bell crank and said second hanger.

4. The combination, with a universally supported shift lever, of a U-shaped hanger pivotally hung from the support, a bell crank pivoted on the base of the hanger and having a forked end embracing the depending portion of said lever and having the other end extending laterally of the hanger, a slot in the hanger base through which the lever extends, and motion transmitting rods connected to said other end of said bell crank and to said extending end of said lever.

5. The combination, with a universally supported shift lever, of a U-shaped hanger pivotally hung from the support, a bell crank pivoted on the base of the hanger and having a forked end embracing the depending portion of said lever and having the other end extending laterally of the hanger, a slot in the hanger base through which the lever extends, and motion transmitting rods connected to said other end of said bell crank and to said hanger.

6. In combination, a transmission having an operating rod projecting therefrom adapted to be axially shifted for gear selecting movement and rotated for gear shifting movement, a remotely disposed gear shift lever, a universal support for said lever having a depending pivotally mounted bracket, said lever rocking said bracket upon fore and aft movement, a corresponding pivotally mounted bracket adjacent said operating rod, motion transmitting means connected between and providing conjoint movement of said brackets, means on said first bracket actuated by lateral rocking of said lever including a link extending to said second bracket, means on said second bracket engaged by said link for axially shifting said operating rod, and means responsive to rocking of said second bracket for rotating said operating rod.

7. In combination, an operating rod adapted to be axially shifted and also rotated, a support therefor from which said rod projects, an arm rigidly connected thereto beyond said support, a remotely disposed shift lever, a U-shaped hanger having its ends pivoted respectively on said rod and support on opposite sides of said arm and means including individual spaced parallel motion transmitting rods between said lever and said hanger selectively actuated upon lateral rocking of said lever and fore and aft movement thereof for respectively actuating said hanger to effect axial shifting and rotating of said operating rod.

8. In combination, an operating rod adapted to be axially shifted and also rotated, an arm rigidly connected thereto, a bracket pivotally mounted to swing about the axis of said rod, a remotely disposed universally supported shift lever, a bell crank actuated upon lateral rocking of said lever, a motion transmitting linkage connected to said bell crank and including a second bell crank pivoted on said bracket and operatively engaging said arm to shift said rod axially, and secondary motion transmitting linkage between said lever and said arm for rotating said operating rod upon fore and aft movement of said lever.

9. In combination, a transmission having an operating rod provided with a rigid arm, a remotely disposed shifting lever, U-shaped brackets pivotally mounted to swing about said rod as a center, and at said lever, and having means operable upon fore and aft movement of said lever for conjointly rocking the brackets about their pivots, bell cranks pivoted on said brackets and interconnected by a motion transmitting rod, and means on said cranks respectively engaging said lever and arm to shift said operating rod axially upon lateral rocking movement of said lever.

10. In combination, a transmission operating rod, a remotely disposed universally supported gear shift lever, means for rotating said rod upon fore and aft movement of said lever, depending hangers pivotally mounted at said lever and about said rod as a center, bell cranks pivotally carried by said hangers, a rod interconnecting said bell cranks to provide for conjoint pivotal movement, and means operatively connecting said bell cranks and said lever and operating rod, respectively, whereby upon lateral rocking of said lever the bell crank connected to said operating rod acts to shift said operating rod axially.

11. In combination, a transmission operating rod having a normally extending arm, a U-shaped bracket pivoted to swing about said rod as a center and having a slot receiving said arm to accommodate axial shifting of said rod, a remotely disposed shift lever having universal pivotal support intermediate its ends, a second U-shaped bracket pivoted on said support and having a slot accommodating lateral rocking of the depending end of said lever, bell cranks pivotally mounted on the base of each bracket, and a rod interconnecting said bell cranks, one end of each bell crank being respectively engaged by said lever and arm whereby upon lateral rocking of said lever said bell cranks act to shift said operating rod axially.

12. The combination of claim 11 further characterized in the provision of motion transmitting means operable upon fore and aft movement of said lever to rock said arm for rotating said operating rod.

13. The combination of claim 11 further characterized in the provision of a motion transmitting rod interconnecting said brackets whereby fore and aft movement of said lever rocks said brackets to rotate said operating rod.

14. In combination, a transmission operating rod, a remotely disposed gear shift lever, bracket means pivotally mounted at said lever, bracket means mounted to swing about said rod as a center and interconnected by a motion transmitting rod for rotating said operating rod upon fore and aft movement of said lever, said means being inoperative upon lateral rocking of said lever, and bell crank means pivotally mounted upon each of said bracket means and interconnected by a second parallel motion transmitting rod for axially shifting said operating rod upon lateral rocking of said lever.

15. The combination of claim 14 further characterized in that said parallel rods extend along opposite sides of said bracket means and lie in the same horizontal plane.

ROBERT LAPSLEY.